United States Patent
Fukami et al.

(10) Patent No.: US 9,561,709 B2
(45) Date of Patent: Feb. 7, 2017

(54) SUNROOF APPARATUS

(71) Applicant: AISIN SEIKI KABUSHIKI KAISHA, Kariya-shi, Aichi-ken (JP)

(72) Inventors: Kiyozumi Fukami, Chiryu (JP); Hiroyuki Ida, Anjo (JP); Chitose Nishiyama, Handa (JP); Kinju Uchida, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/019,044

(22) Filed: Feb. 9, 2016

(65) Prior Publication Data
US 2016/0229275 A1    Aug. 11, 2016

(30) Foreign Application Priority Data
Feb. 10, 2015   (JP) .................. 2015-024222

(51) Int. Cl.
| B60J 7/22 | (2006.01) |
| B60J 7/043 | (2006.01) |
| E05D 15/06 | (2006.01) |
| E05D 15/10 | (2006.01) |
| B60J 7/00 | (2006.01) |

(52) U.S. Cl.
CPC ............ B60J 7/043 (2013.01); B60J 7/0046 (2013.01); E05D 15/0621 (2013.01); E05D 15/10 (2013.01)

(58) Field of Classification Search
CPC ..................................... B60J 7/02; B60J 7/22
USPC ....................................................... 296/217
See application file for complete search history.

(56) References Cited

U.S. PATENT DOCUMENTS

| 4,114,945 | A | * | 9/1978 | Lutz | .................. B60J 7/02 16/93 R |
| 4,811,925 | A | * | 3/1989 | Fujita | ............... B60N 2/0715 248/430 |
| 5,484,184 | A | * | 1/1996 | Kohlpaintner | ......... B60J 7/0046 296/214 |
| 5,681,116 | A | * | 10/1997 | Lin | .................... A47B 21/0314 108/140 |
| 6,763,550 | B2 | * | 7/2004 | Regnier | ............... E05F 11/382 16/193 |

(Continued)

FOREIGN PATENT DOCUMENTS

JP         2011-93471         5/2011

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus includes: a movable panel adapted to open and close an opening formed in a roof of a vehicle; a guide rail provided in each edge portion of the opening in a lateral direction, and including upper and lower flanges extending in the lateral direction and a connecting wall through which the respective outside ends of the upper and lower flanges in the lateral direction are connected to each other in the vertical direction; and a shielding body attached to each edge portion of the movable panel in the lateral direction, and including an extending piece that extends to the outside in the lateral direction while being interposed between the upper and lower flanges, wherein the shielding body includes first and second projections which are provided in the extending piece and can be respectively brought into contact with the upper and lower flanges.

1 Claim, 4 Drawing Sheets

VEHICLE INTERIOR SIDE ⟵⟶ VEHICLE EXTERIOR SIDE
LATERAL DIRECTION

(56) References Cited

U.S. PATENT DOCUMENTS

| | | | | |
|---|---|---|---|---|
| 6,799,796 B2 * | 10/2004 | Radmanic | ............ | B60J 7/02 |
| | | | | 296/216.08 |
| 8,220,868 B2 * | 7/2012 | Fraley | ............ | B60J 7/0046 |
| | | | | 160/84.04 |

* cited by examiner

VEHICLE INTERIOR SIDE ←——————→ VEHICLE EXTERIOR SIDE
LATERAL DIRECTION

SUNROOF APPARATUS

CROSS REFERENCE TO RELATED APPLICATIONS

This application is based on and claims priority under 35 U.S.C. §119 to Japanese Patent Application 2015-024222, filed on Feb. 10, 2015, the entire contents of which are incorporated herein by reference.

TECHNICAL FIELD

This disclosure relates to a sunroof apparatus.

BACKGROUND DISCUSSION

In the related art, a sunroof apparatus disclosed in JP 2011-93471A (Reference 1) is known. This sunroof apparatus includes a shielding body, an upper end side of which is mounted to each edge portion of a movable panel in a lateral direction of a vehicle where the movable panel opens and closes an opening formed in a roof of the vehicle, and a lower end side of which is slidably engaged with a long guide portion disposed in each edge portion of the opening in the lateral direction of the vehicle. The shielding body shields an operation mechanism of the sunroof apparatus from a vehicle interior side. The shielding body is moved together with the movable panel while being slid against the guide portion during an opening and closing operation of the movable panel.

Specifically, the guide portion (a second guide groove) has a substantially U-shaped constant section, opens to the inside in the lateral direction of the vehicle, and extends in a longitudinal direction of the vehicle. The guide portion includes a pair of an upper wall portion and a lower wall portion which extend parallel to each other inward in the lateral direction of the vehicle. In contrast, a lower end piece portion is formed in a lower end portion of the shielding body (side garnish) such that the lower end piece portion extends outward in the lateral direction of the vehicle, and is interposed between the upper wall portion and the lower wall portion. The lower end piece portion also extends in the longitudinal direction of the vehicle. The shielding body is moved in the longitudinal direction of the vehicle while the lower end piece portion interposed between the upper wall portion and the lower wall portion is slid.

In the sunroof apparatus disclosed in Reference 1, a gap in a vertical direction of the vehicle may occur between the upper wall portion and the lower end piece portion and between the lower wall portion and the lower end piece portion due to variations in a mounting position or component accuracy. Accordingly, when, during sliding, the lower end side (the lower end piece portion) of the shielding body is inclined in the lateral direction of the vehicle, and is brought into unbalanced contact with and interfere with the guide portion, sliding resistance may be increased or decreased, and abnormal noise may occur.

It can be considered that the upper wall portion, the lower wall portion, and the lower end piece are set to be in close contact therebetween in the vertical direction of the vehicle no as to prevent the occurrence of a gap therebetween. In contrast, when these portions excessively overlap with each other in the vertical direction of the vehicle due to variations in component accuracy or the like, sliding resistance is excessively increased, which is another problem.

SUMMARY

Thus, a need exists for a sunroof apparatus which is not suspectable to the drawback mentioned above.

A sunroof apparatus according to an aspect of this disclosure includes: a movable panel adapted to open and close an opening formed in a roof of a vehicle; a guide rail which is provided in each edge portion of the opening in a lateral direction of the vehicle in such a way as to be positioned below the movable panel in a vertical direction of the vehicle, and to extend in a longitudinal direction of the vehicle, and includes an upper flange and a lower flange which extend in the lateral direction of the vehicle to be parallel to each other while being separated from each other in the vertical direction of the vehicle, and a connecting wall through which the respective outside ends of the upper flange and the lower flange in the lateral direction of the vehicle are connected to each other in the vertical direction of the vehicle; and a shielding body which is attached to each edge portion of the movable panel in the lateral direction of the vehicle in such a way as to extend in the longitudinal direction of the vehicle, and includes an extending piece that extends to the outside in the lateral direction of the vehicle while being interposed between the upper flange and the lower flange. The shielding body includes a first projection and a second projection which are provided in the extending piece in such a way as to respectively protrude upward and downward in the vertical direction of the vehicle, and which can be respectively brought into contact with the upper flange and the lower flange.

A sunroof apparatus according to another aspect of this disclosure includes: a movable panel adapted to open and close an opening formed in a roof of a vehicle; a guide rail which is provided in each edge portion of the opening in a lateral direction of the vehicle in such a way as to be positioned below the movable panel in a vertical direction of the vehicle, and to extend in a longitudinal direction of the vehicle, and includes a flange extending to the inside in the lateral direction of the vehicle; and a shielding body which is attached to each edge portion of the movable panel in the lateral direction of the vehicle in such a way as to extend in the longitudinal direction of the vehicle; and includes an upper extending piece and a lower extending piece which extend in the lateral direction of the vehicle while being separated from each other in the vertical direction of the vehicle with the flange interposed between the upper extending piece and the lower extending piece, and a connecting portion through which the respective inside ends of the upper extending piece and the lower extending piece in the lateral direction of the vehicle are connected to each other in the vertical direction of the vehicle. The shielding body includes an upper projection which is provided in the upper extending piece in such a way as to protrude downward in the vertical direction of the vehicle, and which can be brought into contact with the flange, and a lower projection which is provided in the lower extending piece in such a way as to protrude upward in the vertical direction of the vehicle, and which can be brought into contact with the flange.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a sunroof apparatus will be described. In the following description, a "longitudinal direction" refers to a longitudinal direction of a vehicle, and an "upper side" and a "lower side" refer to an upper side and a lower side of the vehicle in a vertical direction of the vehicle, respectively. A "vehicle interior side" refers to the inside of the vehicle in a lateral direction of the vehicle, which is a passenger compartment side. A "vehicle exterior side" refers to the outside of the vehicle in the lateral direction, which is the outside of the passenger compartment.

Figure 1:
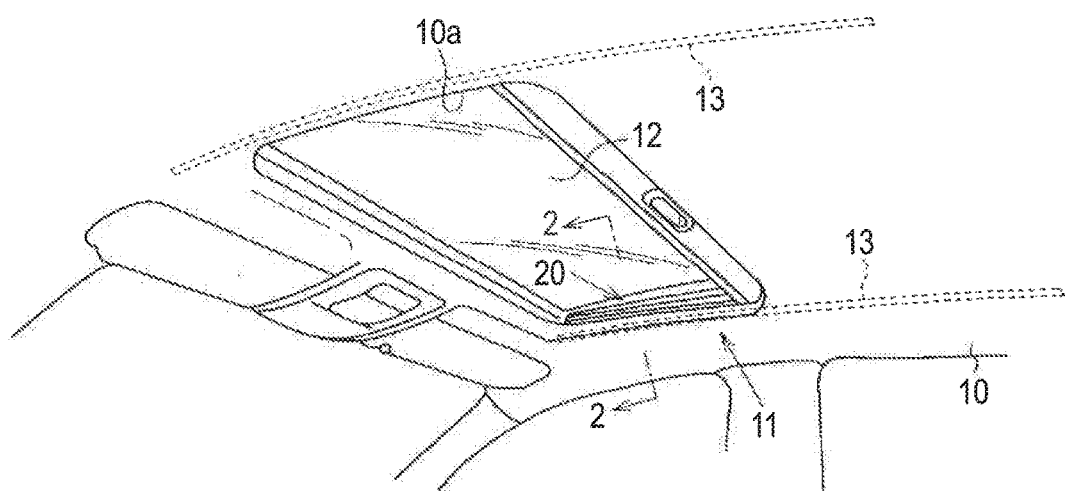
FIG. 1 is a perspective view in an embodiment when a sunroof apparatus is diagonally seen from a lower side.

As illustrated in FIG. 1, a substantially rectangular opening 10a is formed in a roof 10 of a vehicle such as an automobile, and a sunroof apparatus 11 is mounted in the roof 10. The sunroof apparatus 11 includes a substantially rectangular movable panel 12, for example, made of a glass plate, which is moved in the longitudinal direction to open and close the opening 10a. The sunroof apparatus 11 includes a pair of guide rails 13 which are respectively disposed in both edge portions of the opening 10a in the lateral direction of the vehicle. Each of the guide rails 13 is made of an extruded aluminum alloy material or the like, and extends in the longitudinal direction while having a constant section in a longitudinal direction of the guide rail 13.

Figure 2:
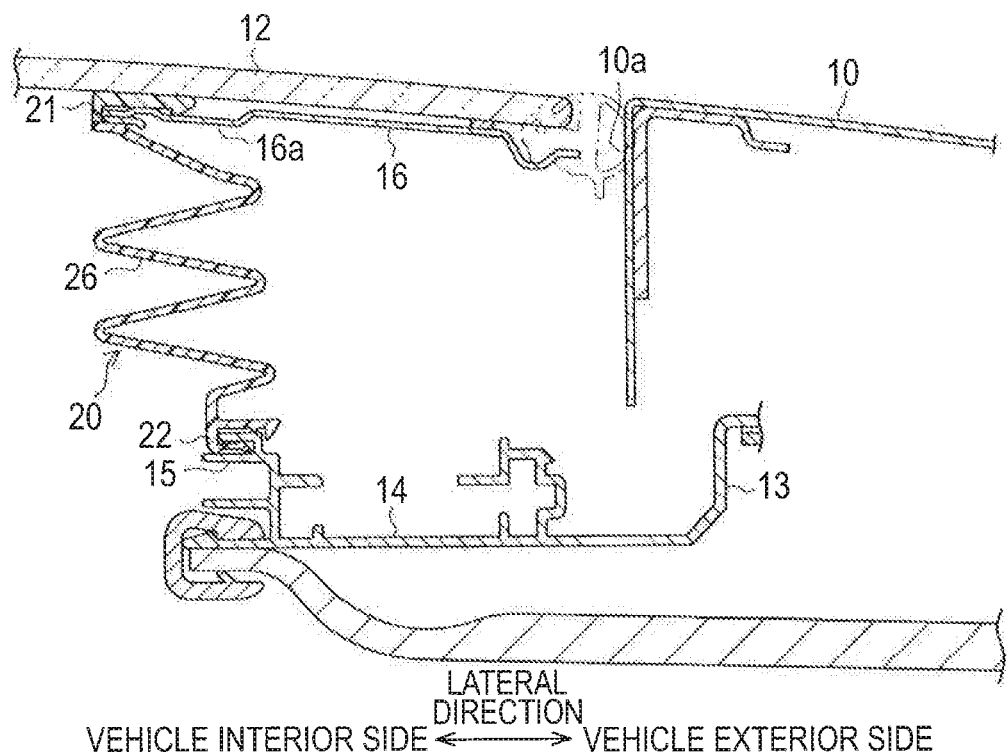
FIG. 2 is a sectional view taken along line II-II in FIG. 1.
Figure 3:
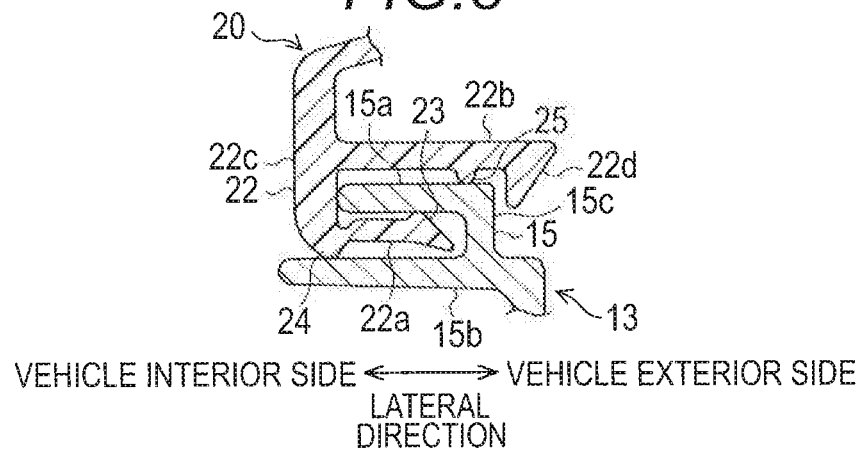
FIG. 3 is an enlarged view of FIG. 2.

That is, as illustrated in FIG. 2, the guide rail 13 includes a first guide portion 14 having a substantially C-shaped section and opens to the upper side. The guide rail 13 includes a second guide portion 15 connected to an end upper portion of the first guide portion 14 on the vehicle interior side. As illustrated in FIG. 3, the second guide portion 15 includes an upper flange 15a and a lower flange 15b which extend to the vehicle interior side from the first guide portion 14 to be parallel to each other while being separated from each other in the vertical direction of the vehicle, and a connecting wall 15c through which the respective ends of the upper flange 15a and the lower flange 15b on the vehicle exterior side are connected to each other in the vertical direction of the vehicle. The second guide portion 15 has a substantially U-shaped section, and opens to the vehicle interior side.

As illustrated in FIG. 2, a suitable sliding member (not illustrated) is supported by the first guide portion 14 so as to be capable of being slid in the longitudinal direction, and is linked to each edge portion of the movable panel 12 in the lateral direction of the vehicle. When the sliding member is moved along the first guide portion 14 in the longitudinal direction, the movable panel 12 is opened and closed. Specifically, when the sliding member is moved to the front of the vehicle, the movable panel 12 in a fully closed state is tilted upward in such a way that a rear portion of the movable panel 12 is turned upward around a front portion of the movable panel 12. Alternatively, when the sliding member is moved to the rear of the vehicle, the movable panel 12 in a fully closed state is tilted downward in such a way that the rear portion of the movable panel 12 is turned downward around the front portion. When the sliding member is further moved to the rear of the vehicle, the movable panel 12 is opened to a fully open state while a tilt-down state is maintained (referred to as a so-called inner sliding method).

A garnish 20 serving as a shielding body is interposed between each edge portion of the movable panel 12 in the lateral direction of the vehicle and the second guide portion 15. The garnish 20 is made of a resin extruded material or the like, and extends in the longitudinal direction while having a constant section in a longitudinal direction of the garnish 20. An upper end portion of the garnish 20 forms a mounting portion 21 which has a substantially U-shaped section and opens to the vehicle exterior side. In contrast, a mounting panel 16, for example, made of a metal plate, is joined to each edge portion of the movable panel 12 in the lateral direction of the vehicle. An end portion of the mounting panel 16 on the vehicle interior side forms a mounting piece 16a that is displaced downward with respect to the movable panel 12. The mounting portion 21 holds the mounting piece 16a in an interposing manner such that the garnish 20 is fixed to the movable panel 12.

A lower end portion of the garnish 20 forms an engaging portion 22 which has a substantially U-shaped section and opens to the vehicle exterior side. As illustrated in FIG. 3, the engaging portion 22 includes a lower extending piece 22a as an extending piece and an upper extending piece 22b as a second extending piece which extend substantially parallel to each other in the lateral direction of the vehicle while being separated from each other in the vertical direction of the vehicle, and between which the upper flange 15a is interposed. In addition, the engaging portion 22 includes a connecting portion 22c through which the respective ends of the lower extending piece 22a and the upper extending piece 22b on the vehicle interior side are connected to each other. The lower extending piece 22a is interposed between the upper flange 15a and the lower flange 15b. A retaining portion 22d having a substantially triangular section is formed in a tip end portion of the upper extending piece 22b in such a way that the retaining portion 22d is disposed closer to the vehicle exterior side than the second guide portion 15, and protrudes downward further than an upper end of the connecting wall 15c. Naturally, the retaining portion 22d extends in the longitudinal direction.

The lower end portion of the garnish 20 includes a first projection 23 having a substantially triangular section, which protrudes upward from an end of the lower extending piece 22a on the vehicle exterior side, and can be brought into contact with a lower surface of the upper flange 15a. In addition, the lower end portion of the garnish 20 includes a second projection 24 having a substantially triangular section, which protrudes downward from an end of the lower extending piece 22a on the vehicle interior side, and can be brought into an upper surface of the lower flange 15b. The lower end portion of the garnish 20 further includes a third projection 25 having a substantially semicircular section, which protrudes downward from an end of the upper extending piece 22b on the vehicle exterior side, and can be brought into an upper surface of the upper flange 15a. The first projection 23, the second projection 24, and the third projection 25 are disposed at different positions in the lateral direction of the vehicle. Naturally, the first projection 23, the second projection 24, and the third projection 25 extend in the longitudinal direction. The garnish 20 is configured such that, basically, the lower extending piece 22a is interposed between the upper flange 15a and the lower flange 15b in a state where the first projection 23 and the second projection 24 are respectively in contact with the upper flange 15a and the lower flange 15b, and the upper flange 15a interposed between the lower extending piece 22a and the upper extending piece 22b in a state where the third projection 25 is in contact with the upper flange 15a. The garnish 20 in this state is supported by the second guide portion 15 in such a way as to be capable of being moved in the longitudinal direction.

As illustrated in FIG. 2, the respective ends of the mounting portion 21 and the engaging portion 22 on the vehicle interior side are connected to each other via a bellows-shaped portion 26 which can be extended and contracted in the vertical direction of the vehicle. The bellows-shaped portion 26 is extended to follow a tilt-up operation of the movable panel 12, and is contracted to follow a tilt-down operation of the movable panel 12. A portion (the first guide portion 14, the sliding member which is slid against the first guide portion 14, or the like) of the sunroof apparatus 11, which is positioned closer to the vehicle exterior side than the garnish 20, is shielded by the garnish 20 from the vehicle interior side.

Hereinafter, an operation in the embodiment will be described.

The garnish 20, which is attached to each edge portion of the movable panel 12 in the lateral direction of the vehicle, is disposed closer to the vehicle interior side than the upper flange 15a, and covers a space between the movable panel 12 and the guide rail 13. When the movable panel 12 is opened and closed, the garnish 20 is moved integrally with the movable panel 12 while being slid against the second guide portion 15. That is, when the mounting portion 21 is moved along with an opening and closing operation of the movable panel 12, the engaging portion 22 is moved along the second guide portion 15 via the bellows-shaped portion 26.

As illustrated in FIG. 3, the garnish 20 is configured such that, basically, the lower extending piece 22a is interposed between the upper flange 15a and the lower flange 15b in a state where the first projection 23 and the second projection 24 are respectively in contact with the upper flange 15a and the lower flange 15b, and the upper flange 15a is interposed between the lower extending piece 22a and the upper extending piece 22b in a state where the third projection 25 is in contact with the upper flange 15a. When the garnish 20 is moved, basically, the first projection 23 and the second projection 24 are respectively in line contact with the upper flange 15a and the lower flange 15b, and the third projection 25 is in line contact with the upper flange 15a. That is, since, basically, contact points between the garnish 20 in movement and the upper flange 15a and between the garnish 20 in movement and the lower flange 15b are limited to the first projection 23, the second projection 24, and the third projection 25, that is, since the garnish 20 in movement is supported by the upper flange 152 and the lower flange 15b at three points, the posture of the garnish 20 when being slid is more stabilized.

Figure 4A:
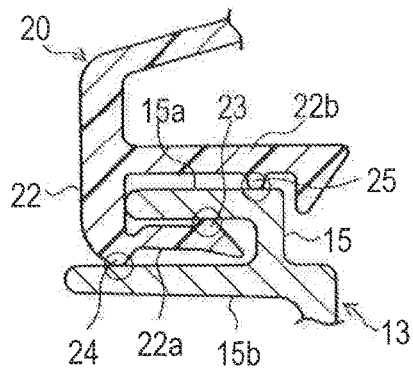
FIGS. 4A to 4F are sectional views illustrating an operation in the embodiment.
Figure 4B:
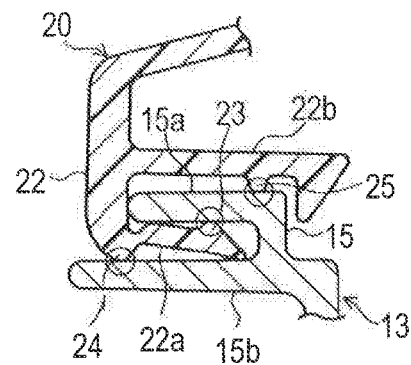

As illustrated in FIG. 4A, the garnish 20 is set such that, even if the clearance between the upper flange 15a and the lower flange 15b in the vertical direction of the vehicle is the maximum tolerance value, when the protruding length of each of the first projection 23, the second projection 24, and the third projection 25 is the maximum tolerance value, as described above, the garnish 20 is supported by the upper flange 15a and the lower flange 15b at three points. Alternatively, as illustrated in FIG. 4B, the garnish 20 is set such that, even if the clearance between the upper flange 15a and the lower flange 15b in the vertical direction of the vehicle is the minimum tolerance value, when the protruding length of each of the first projection 23, the second projection 24, and the third projection 25 is the maximum tolerance value, as described above, the garnish 20 is supported by the upper flange 15a and the lower flange 15b at three points. In FIGS. 4A and 4B, for illustrative purposes, contact points between the second guide portion 15 and the garnish 20 are circled. Similarly, contact points are circled in FIGS. 4C to 4F.

Figure 4C:
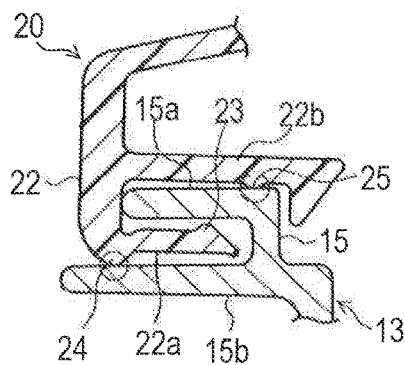

In FIG. 4C, the clearance between the upper flange 15a and the lower flange 15b in the vertical direction of the vehicle is assumed to be the maximum tolerance value, and the protruding length of each of the first projection 23, the second projection 24, and the third projection 25 is assumed to be the minimum tolerance value. In this case, when the garnish 20 is inclined to the vehicle exterior side, and is pressed, the second projection 24 and the third projection 25 are respectively in line contact with the lower flange 15b and the upper flange 15a, and the garnish 20 is supported thereby at two points.

Figure 4D:
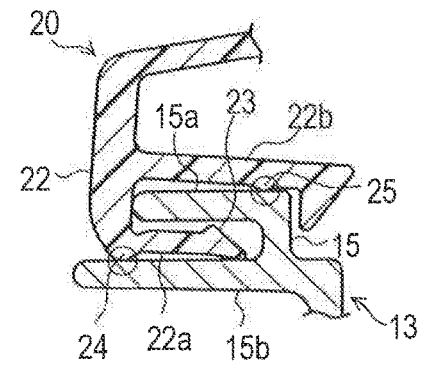

In FIG. 4D, the clearance between the upper flange 15a and the lower flange 15b in the vertical direction of the vehicle is assumed to be the minimum tolerance value, and the protruding length of each of the first projection 23, the second projection 24, and the third projection 25 is assumed to be the minimum tolerance value. Also, in this case, when the garnish 20 is inclined to the vehicle exterior side, and is pressed, the second projection 24 and the third projection 25 are respectively in line contact with the lower flange 15b and the upper flange 15a, and the garnish 20 is supported thereby at two points.

Figure 4E:
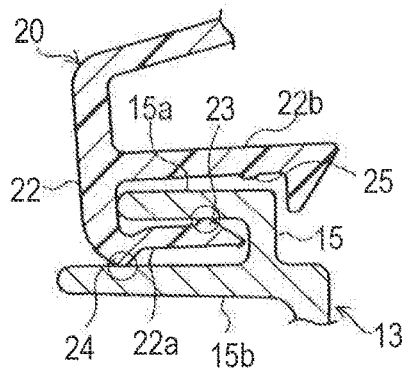

In FIG. 4E, the garnish 20 is assumed to be configured such that the clearance between the upper flange 15a and the lower flange 15b in the vertical direction of the vehicle is the maximum tolerance value, and the protruding length of each of the first projection 23, the second projection 24, and the third projection 25 is the minimum tolerance value. In this case, when the garnish 20 is inclined to the vehicle interior side, and is pressed, the first projection 23 and the second projection 24 are respectively in line contact with the upper flange 15a and the lower flange 15b, and the garnish 20 is supported thereby at two points.

Figure 4F:
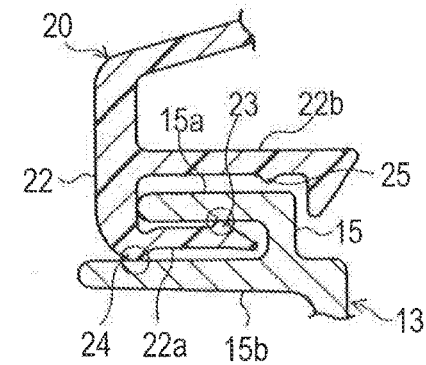

In FIG. 4F, the clearance between the upper flange 15a and the lower flange 15b in the vertical direction of the vehicle is assumed to be the minimum tolerance value, and the protruding length of each of the first projection 23, the second projection 24, and the third projection 25 is the minimum tolerance value. Also, in this case, when the garnish 20 is inclined to the vehicle interior side, and is pressed, the first projection 23 and the second projection 24 are respectively in line contact with the upper flange 15a and the lower flange 15b in a state where the garnish 20 is inclined to the vehicle interior side and is pressed, and the garnish 20 is supported thereby at two points.

As described above in detail, according to the embodiment, the following effects can be obtained.

(1) In the embodiment, the garnish 20, which is attached to each edge portion of the movable panel 12 in the lateral direction of the vehicle, is disposed closer to the vehicle interior side than the upper flange 15a, and covers the space between the movable panel 12 and the guide rail 13. When the movable panel 12 is opened and closed, the garnish 20 is moved integrally with the movable panel 12 while the lower extending piece 22a is moved in the longitudinal direction of the vehicle with the lower extending piece 22a interposed between the upper flange 15a and the lower flange 15b. At this time, since, basically, the first projection 23 and the second projection 24 are respectively in line contact with the upper flange 15a and the lower flange 15b, that is, since the contact points between the garnish 20 and the upper flange 15a and between the garnish 20 and the lower flange 15b are limited to the first projection 23 and the second projection 24, the posture of the garnish 20 when being slid can be more stabilized. Even if the garnish 20 is inclined in the lateral direction of the vehicle due to variations in a mounting posture, component accuracy, or the like, either the first projection 23 or the second projection 24 continues to be more reliably in contact with the corresponding one of the upper flange 15*a* and the lower flange 15*b*. As a result, it is possible to suppress an increase or a decrease in the sliding resistance of the garnish 20, and to suppress the occurrence of abnormal noise associated with sliding resistance. Alternatively, it is possible to more stabilize sliding of the garnish 20.

(2) In the embodiment, when the movable panel 12 is opened and closed, the garnish 20 is moved integrally with the movable panel 12 while the upper extending piece 22*b* is moved in the longitudinal direction with the upper flange 15*a* interposed between the lower extending piece 22*a* and the upper extending piece 22*b*. At this time, since, basically, the third projection 25 is also in line contact with the upper flange 15*a*, the posture of the garnish 20 when being slid can be more stabilized. Even if the garnish 20 is inclined in the lateral direction of the vehicle due to variations in a mounting posture, component accuracy, or the like, two of the first projection 23, the second projection 24, and the third projection 25 continue to be more reliably in contact with the corresponding one of the upper flange 15*a* and the lower flange 15*b*. As a result, it is possible to suppress an increase or a decrease in the sliding resistance of the garnish 20, and to suppress the occurrence of abnormal noise associated with sliding resistance.

(3) In the embodiment, since the retaining portion 22*d* retains the garnish 20 with respect to the guide rail 13 (the second guide portion 15) in the lateral direction of the vehicle, it is possible to suppress falling of the garnish 20 from the guide rail 13 in the lateral direction of the vehicle.

(4) In the embodiment, since the first projection 23, the second projection 24, and the third projection 25 extend in the longitudinal direction, these projections can be simultaneously formed when the garnish 20 is extrusion-molded.

(5) In the embodiment, since contact points between the upper flange 15*a* and the engaging portion 22 and between the lower flange 15*b* and the engaging portion 22 are limited to the first projection 23, the second projection 24, and the third projection 25, it is possible to reduce sliding resistance to the extent that contact areas are reduced.

(6) In the embodiment, since the third projection 25 provided in the upper extending piece 22*b* is slid against the second guide portion 15 (the guide rail 13) in addition to sliding of the first projection 23 and the second projection 24 (provided in the lower extending piece 22*a*) against the second guide portion 15, it is possible to reduce the range of a change in sliding resistance caused by product variations of the second guide portion 15 (the guide rail 13) compared to when only the first projection 23 and the second projection 24 are slid against the second guide portion 15.

The following changes may be made to the embodiment.

Figure 5:
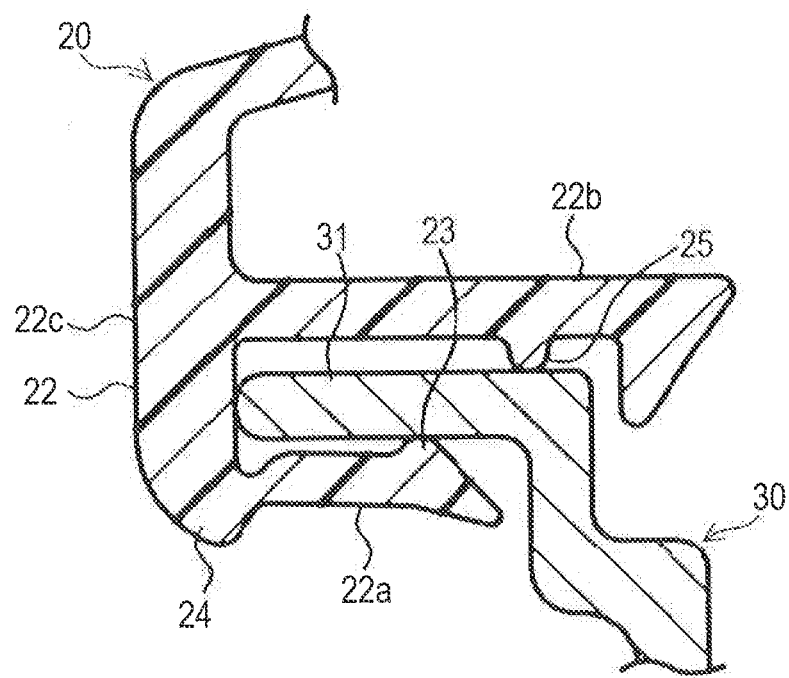
FIG. 5 is a sectional view illustrating a modification embodiment.

As illustrated in FIG. 5, the lower flange 15*b* may be omitted, and a flange 31 equivalent to the upper flange 15*a* may be a portion of a guide rail 30 extending to the vehicle interior side. In this case, when the movable panel 12 is opened and closed, the garnish 20 is moved integrally with the movable panel 12 while the lower extending piece 22*a* and the upper extending piece 22*b* are moved in the longitudinal direction of the vehicle with the flange 31 interposed between the lower extending piece 22*a* and the upper extending piece 22*b*. At this time, since, basically, the third projection 25 as an upper projection and the first projection 23 as a lower projection are in line contact with the flange 31, that is, since contact points between the garnish 20 and the flange 31 are limited to the third projection 25 and the first projection 23, the posture of the garnish 20 when being slid can be more stabilized. Even if the garnish 20 is inclined in the lateral direction of the vehicle due to variations in a mounting posture, component accuracy, or the like, either the third projection 25 or the first projection 23 continues to be more reliably in contact with the flange 31, it is possible to suppress an increase or a decrease in the sliding resistance of the garnish 20, and to suppress the occurrence of abnormal noise associated with sliding resistance. The second projection 24 may be omitted.

In the embodiment, the upper extending piece 22*b* and the third projection 25 may be omitted.

In the embodiment, two or more of the first projection 23, the second projection 24, and the third projection 25 may be disposed such that the positions thereof in the lateral direction of the vehicle coincide with each other.

In the embodiment, the garnish 20 is preferably made of resin having a low coefficient of friction. Alternatively, the first projection 23, the second projection 24, and the third projection 25 (the engaging portion 22) may be coated with a low-friction material.

In the embodiment, the garnish 20 may be molded by a method other than extrusion molding. In this case, at least one of the first projection 23, the second projection 24, and the third projection 25 may not extend over the total length of the garnish 20 in the longitudinal direction.

In the embodiment, when the garnish 20 is molded, any one of the mounting portion 21, the engaging portion 22, and the bellows-shaped portion 26 may be extrusion-molded, and the remainder may be molded by outsert molding or the like.

Hereinafter, technical ideas, which can be known from the embodiment and the other examples, are additionally described.

A sunroof apparatus according to an aspect of this disclosure includes: a movable panel adapted to open and close an opening formed in a roof of a vehicle; a guide rail which is provided in each edge portion of the opening in a lateral direction of the vehicle in such a way as to be positioned below the movable panel in a vertical direction of the vehicle, and to extend in a longitudinal direction of the vehicle, and includes an upper flange and a lower flange which extend in the lateral direction of the vehicle to be parallel to each other while being separated from each other in the vertical direction of the vehicle, and a connecting wall through which the respective outside ends of the upper flange and the lower flange in the lateral direction of the vehicle are connected to each other in the vertical direction of the vehicle; and a shielding body which is attached to each edge portion of the movable panel in the lateral direction of the vehicle in such a way as to extend in the longitudinal direction of the vehicle, and includes an extending piece that extends to the outside in the lateral direction of the vehicle while being interposed between the upper flange and the lower flange. The shielding body includes a first projection and a second projection which are provided in the extending piece in such away as to respectively protrude upward and downward in the vertical direction of the vehicle, and which can be respectively brought into contact with the upper flange and the lower flange.

In this configuration, the shielding body, which is attached to each edge portion of the movable panel in the lateral direction of the vehicle, is disposed closer to the inside than the upper flange in the lateral direction of the vehicle, and covers a space between the movable panel and the guide rail.

When the movable panel is opened and closed, the shielding body is moved integrally with the movable panel while the extending piece is moved in the longitudinal direction of the vehicle with the extending piece interposed between the upper flange and the lower flange. At this time, since, basically, the first projection and the second projection are respectively in line contact with the upper flange and the lower flange, that is, since contact points between the shielding body and the upper flange and between the shielding body and the lower flange are limited to the first projection and the second projection, the posture of the shielding body when being slid can be more stabilized. Even if the shielding body is inclined in the lateral direction of the vehicle due to variations in a mounting posture, component accuracy, or the like, either the first projection or the second projection continues to be more reliably in contact with the corresponding one of the upper flange and the lower flange. As a result, it is possible to suppress an increase or a decrease in the sliding resistance of the shielding body, and to suppress the occurrence of abnormal noise associated with sliding resistance.

A sunroof apparatus according to another aspect of this disclosure includes: a movable panel adapted to open and close an opening formed in a roof of a vehicle; a guide rail which is provided in each edge portion of the opening in a lateral direction of the vehicle in such a way as to be positioned below the movable panel in a vertical direction of the vehicle, and to extend in a longitudinal direction of the vehicle, and includes a flange extending to the inside in the lateral direction of the vehicle; and a shielding body which is attached to each edge portion of the movable panel in the lateral direction of the vehicle in such a way as to extend in the longitudinal direction of the vehicle, and includes an upper extending piece and a lower extending piece which extend in the lateral direction of the vehicle while being separated from each other in the vertical direction of the vehicle with the flange interposed between the upper extending piece and the lower extending piece, and a connecting portion through which the respective inside ends of the upper extending piece and the lower extending piece in the lateral direction of the vehicle are connected to each other in the vertical direction of the vehicle. The shielding body includes an upper projection which is provided in the upper extending piece in such a way as to protrude downward in the vertical direction of the vehicle, and which can be brought into contact with the flange, and a lower projection which is provided in the lower extending piece in such a way as to protrude upward in the vertical direction of the vehicle, and which can be brought into contact with the flange.

In this configuration, the shielding body, which is attached to each edge portion of the movable panel in the lateral direction of the vehicle, is disposed closer to the inside than the flange in the lateral direction of the vehicle, and covers a space between the movable panel and the guide rail. When the movable panel is opened and closed, the shielding body is moved integrally with the movable panel while the upper extending piece and the lower extending piece are moved in the longitudinal direction of the vehicle with the flange interposed between the upper extending piece and the lower extending piece. At this time, since, basically, the upper projection and the lower projection are respectively in line contact with the flange, that is, since contact points between the shielding body and the flange are limited to the upper projection and the lower projection, the posture of the shielding body when being slid can be more stabilized. Even if the shielding body is inclined in the lateral direction of the vehicle due to variations in a mounting posture, component accuracy, or the like, either the upper projection or the lower projection continues to be more reliably in contact with the flange. As a result, it is possible to suppress an increase or a decrease in the sliding resistance of the shielding body, and to suppress the occurrence of abnormal noise associated with sliding resistance.

In the sunroof apparatus, it is preferable that the shielding body includes a second extending piece which is positioned above the extending piece in the vertical direction of the vehicle in such a way as to extend to the outside in the lateral direction of the vehicle while the upper flange is interposed between the extending piece and the second extending piece, and a third projection which is provided in the second extending piece in such a way as to protrude downward in the vertical direction of the vehicle, and which can brought into contact with the upper flange.

In this configuration, when the movable panel is opened and closed, the shielding body is moved integrally with the movable panel while the second extending piece is moved in the longitudinal direction of the vehicle with the upper flange interposed between the extending piece and the second extending piece. At this time, since, basically, the third projection is additionally in line contact with the upper flange, the posture of the shielding body when being slid can be more stabilized. Even if the shielding body is inclined in the lateral direction of the vehicle due to variations in a mounting posture, component accuracy, or the like, two of the first to the third projections continue to be more reliably in contact with the corresponding one of the upper flange and the lower flange. As a result, it is possible to suppress an increase or a decrease in the sliding resistance of the shielding body, and to suppress the occurrence of abnormal noise associated with sliding resistance.

In the sunroof apparatus, it is preferable that the shielding body includes a retaining portion which is provided in a tip end portion of the upper extending piece in the lateral direction of the vehicle in such a way as to protrude downward in the vertical direction of the vehicle, and retains the shielding body with respect to the guide rail in the lateral direction of the vehicle.

In this configuration, it is possible to suppress falling of the shielding body from the guide rail in the lateral direction of the vehicle.

A sunroof apparatus according to still another aspect of this disclosure includes: a movable panel adapted to open and close an opening formed in a roof of a vehicle; a guide rail which is provided in each edge portion of the opening in a lateral direction of the vehicle in such a way as to be positioned below the movable panel in a vertical direction of the vehicle, and to extend in a longitudinal direction of the vehicle, and includes an upper flange and a lower flange which extend in the lateral direction of the vehicle to be parallel to each other while being separated from each other in the vertical direction of the vehicle, and a connecting wall through which the respective outside ends of the upper flange and the lower flange in the lateral direction of the vehicle are connected to each other in the vertical direction of the vehicle; and a shielding body which is attached to each edge portion of the movable panel in the lateral direction of the vehicle in such as to extend in the longitudinal direction of the vehicle, and includes an upper extending piece and a lower extending piece which extend in the lateral direction of the vehicle while being separated from each other in the vertical direction of the vehicle with the upper flange interposed between the upper extending piece and the lower extending piece, and a connecting portion through which the respective inside end of the upper extending piece and the lower extending piece in the lateral direction of the vehicle are connected to each other in the vertical direction of the vehicle, and in which the lower extending piece is interposed between the upper flange and the lower flange. The shielding body includes a first projection and a second projection which are provided in the lower extending piece in such a way as to respectively protrude upward and downward in the vertical direction of the vehicle, and which can be respectively brought into contact with the upper flange and the lower flange, and a third projection which is provided in the upper extending piece in such a way as to protrude downward in the vertical direction of the vehicle, and which can brought into contact with the upper flange.

In this configuration, the shielding body, which is attached to each edge portion of the movable panel in the lateral direction of the vehicle, is disposed closer to the inside than the upper flange in the lateral direction of the vehicle, and covers a space between the movable panel and the guide rail. When the movable panel is opened and closed, the shielding body is moved integrally with the movable panel while the lower extending piece is moved in the longitudinal direction of the vehicle with the lower extending piece interposed between the upper flange and the lower flange, and the upper extending piece is moved in the longitudinal direction of the vehicle with the upper flange interposed between the lower extending piece and the upper extending piece. At this time, since, basically, the first projection and the second projection are respectively in line contact with the upper flange and the lower flange, and the third projection is in line contact with the upper flange, that is, since contact points between the shielding body and the upper flange and between the shielding body and the lower flange are limited to the first to the third projections, the posture of the shielding body when being slid can be more stabilized. Even if the shielding body is inclined in the lateral direction of the vehicle due to variations in a mounting posture, component accuracy, or the like, two of the first to the third projections continue to be more reliably in contact with the corresponding one of the upper flange and the lower flange. As a result, it is possible to suppress an increase or a decrease in the sliding resistance of the shielding body, and to suppress the occurrence of abnormal noise associated with sliding resistance.

According to the aspects of this disclosure, it is possible to suppress the occurrence of abnormal noise associated with an increase or a decrease in sliding resistance.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof apparatus comprising:
a movable panel adapted to open and close an opening formed in a roof of a vehicle;
a guide rail which is provided in each edge portion of the opening in a lateral direction of the vehicle in such a way as to be positioned below the movable panel in a vertical direction of the vehicle, and to extend in a longitudinal direction of the vehicle, and includes an upper flange and a lower flange which extend in the lateral direction of the vehicle to be parallel to each other while being separated from each other in the vertical direction of the vehicle, and a connecting wall through which the respective outside ends of the upper flange and the lower flange in the lateral direction of the vehicle are connected to each other in the vertical direction of the vehicle; and
a shielding body which is attached to each edge portion of the movable panel in the lateral direction of the vehicle in such a way as to extend in the longitudinal direction of the vehicle, and includes a lower extending piece that extends to the outside in the lateral direction of the vehicle while being interposed between the upper flange and the lower flange, and includes an upper extending piece positioned above the lower extending piece in the vertical direction of the vehicle in such a way as to extend to the outside in the lateral direction of the vehicle while the upper flange is interposed between the extending piece and the upper extending piece,
wherein the shielding body includes a single lower outer first projection and a single lower medial second projection which are provided in the lower extending piece in such a way as to respectively protrude upward and downward in the vertical direction of the vehicle, and which can be respectively brought into contact with the upper flange and the lower flange,
wherein the shielding body includes a single lower innermost third projection which is provided in the upper extending piece in such a way as to protrude downward in the vertical direction of the vehicle, and which can be respectively brought into contact with the upper flange, and
wherein the first projection, the second projection, and the third projection extend in the longitudinal direction.

* * * * *